(12) United States Patent  
Fridman

(10) Patent No.: US 7,513,077 B2
(45) Date of Patent: Apr. 7, 2009

(54) METHOD AND SYSTEM FOR DISINFECTION AND AERATION OF SOIL

(76) Inventor: Igor Fridman, 14/6 Dizengoff, Netanya, 42405 (IL)

( * ) Notice: Subject to any disclaimer, the term of this patent is extended or adjusted under 35 U.S.C. 154(b) by 218 days.

(21) Appl. No.: 11/560,366

(22) Filed: Nov. 16, 2006

(65) Prior Publication Data

US 2008/0115410 A1  May 22, 2008

(51) Int. Cl.
*A01B 77/00* (2006.01)
*A01G 9/08* (2006.01)
*A01G 9/10* (2006.01)
*C05D 9/00* (2006.01)
*C09K 17/14* (2006.01)

(52) U.S. Cl. .................. 47/1.01 R; 47/1.42; 47/58.1 SC; 47/905; 47/DIG. 10; 47/DIG. 12

(58) Field of Classification Search .............. 47/1.01 R, 47/1.42, 1.44, 58.1 R, 58.1 SC, 905, DIG. 8, 47/DIG. 9, DIG. 10, DIG. 12

See application file for complete search history.

(56) References Cited

U.S. PATENT DOCUMENTS

| | | | |
|---|---|---|---|
| 2,986,841 A | 6/1961 | MacDonald | |
| 4,420,901 A | 12/1983 | Clarke | |
| 5,176,445 A | 1/1993 | Mize | |
| 5,199,212 A | 4/1993 | Newcomb | |
| 5,405,579 A | 4/1995 | Melzer et al. | |
| 5,430,691 A | 7/1995 | Fridman | |
| 5,553,414 A | 9/1996 | Chapman et al. | |
| 5,626,249 A * | 5/1997 | Tylko | 219/121.59 |
| 5,776,422 A | 7/1998 | Kawasaki | |
| 5,882,381 A * | 3/1999 | Hauck et al. | 95/109 |
| 6,204,429 B1 * | 3/2001 | Gupta et al. | 405/128.45 |
| 6,394,009 B1 | 5/2002 | Yonat et al. | |
| 6,655,082 B1 | 12/2003 | Paltin et al. | |

FOREIGN PATENT DOCUMENTS

JP 2001353205 12/2001
RU 2015628 C1 * 7/1994

* cited by examiner

*Primary Examiner*—Christopher J. Novosad

(57) ABSTRACT

A method and a system for soil disinfection and aeration by generating shock waves and a flow of detonation products on soil particles. The system includes a combustion chamber having an input port for supplying a predetermined air-fuel mixture to the combustion chamber. An igniter for igniting the air-fuel mixture in the combustion chamber. Means for shifting soil particles into an internal space where shock waves propagate. Rotovator which has rotary blades crumbles soil and shifts soil particles into the internal space of the rotovator. A flame arrester is attached between an air-fuel supply line and the input port. An outlet nozzle increases pressure of the detonation wave and thereby increases the pressure of shock waves and the velocity of detonation products A reflecting plate operates to reflect shock waves after the shock waves pass the soil particles Soil particles receive an additional impact during collision with the reflector plate. The system may be connected and pulled by a mode of transportation used in agriculture, such as a tractor, to efficiently disinfect large areas of soil.

15 Claims, 5 Drawing Sheets

METHOD AND SYSTEM FOR DISINFECTION AND AERATION OF SOIL

FIELD OF THE INVENTION

Figure 1:
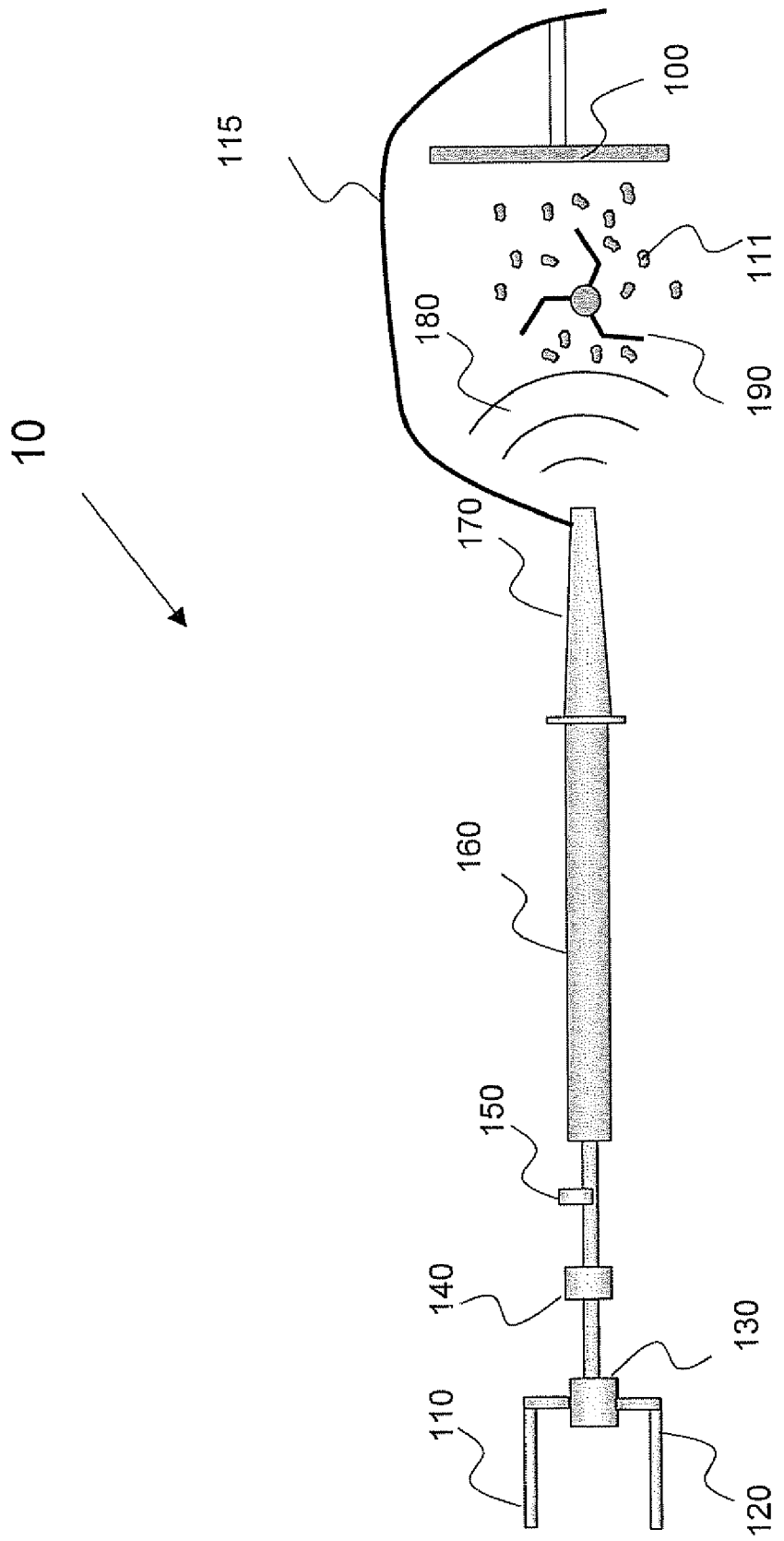

The present invention relates to agriculture technology, and more particularly to soil disinfection and aeration

BACKGROUND OF THE INVENTION

Soil disinfection is a standard procedure among crop growers in agriculture industry and in large scale home gardening. Soil disinfection is aimed to prevent negative influence of parasites and pathogens to the crop. The extermination of the soil parasites and pathogens is an attempt to make the soil more productive and healthier, by avoiding soil and plant diseases, which are passed by the soil parasites and pathogens, a tastier and healthier harvest is produced.

Commonly, organic and non-organic chemicals, in particular methyl bromide, are used to control pests and pathogens and to protect agricultural commodities. For example, methyl bromide may be used as a fumigant on many products, including fruits, nuts, vegetables, plants, bulbs, seeds, cotton, tobacco, bailed hay, and lumber, in railroad cars and in ships. Unfortunately, methyl bromide has been shown to have a significant ozone depleting potential, being responsible for approximately 5-10% of the global ozone destruction, as well as being acutely toxic. Therefore it is now an ever growing desire to reduce to a minimum of such disinfecting methods and in some cases chemical disinfecting is already forbidden.

Another known method for soil disinfecting uses steam to penetrate the soil and destroy worms, insects and other soil parasites. However, the use of the steam is not an effective treatment due to large-scale area which is needed to be treated. Moreover, steam penetration is a costly method due to the large-scale area which needs to be treated. U.S. Pat. No. 6,394,009 discloses a method and apparatus for the disinfection of soil Flames are generated into the soil, at the desired depth and at predetermined distances between them, so as to produce a relatively uniform heating of the soil. The flames may be produced by igniting streams of liquid or gaseous fuel, however this device is costly, the flames can't penetrate into the soil and are incapable of disinfecting it from the parasites and pathogens that are inside the soil. In methods for soil disinfection which includes the use of flames a uniform heating of the soil is very difficult to achieve.

JP 2001353205 discloses an apparatus for enhancing a disinfecting effect for burning soil by a radiating flame. However, the excessive heat used by this method tends to cause equipment failure in the rotating parts.

U.S. Pat. No. 6,655,082 discloses an apparatus for enhancing a disinfecting effect by throwing hot air into a soil treating chamber. A mobile soil-disinfecting device comprising a cultivating unit, a soil treating chamber, a heat exchanger, and a heat-generating unit. Although this method consumes a large amount of energy in order to reach the high temperature required to destroy soil pests, however the parasites and pathogens are not effectively destroyed and is not suitable for large areas.

Still another method exploits solar radiation Plastic sheets are spread on the soil, heated by the solar radiation and transmit the heat to the soil. This method is practical only when the solar radiation is sufficiently intense. This method is very time consuming.

Other known methods are disclosed in U.S. Pat. No. 2,986,841 which describes a mobile earth treating apparatus in which earth is scraped and broken up and then thrown up while being subjected to the effect of a spraying device or a flame thrower.

U.S. Pat. No. 5,199,212 discloses a soil decontamination system including a pulverizer and a heater volatilizing contaminants which are then burned as fuel in an internal combustion engine.

U.S. Pat. No. 5,553,414 discloses a mobile device for destroying soil borne pests, the device including a lift for raising soil from the ground, a drum in which the soil is heated and a discharger for discharging the treated soil in the ground.

U.S. Pat. No. 4,420,901 discloses a mobile device for flame treating of soil, the device including an elongated tube member in which the soil is conveyed by a screw-type conveyor while being flamed U.S. Pat. No. 5,405,579 discloses a method for soil decontamination by passing excavated soil to a thermal treatment zone, heating the soil at super atmospheric pressure within a rotary drum, at the absence of oxygen, wherein resultant gasses pollutant steam are condensed and separated.

U.S. Pat. No. 5,776,422 discloses an apparatus for cleaning top soil, e.g. of a playground. The device is adapted for evenly sterilizing the soil by lifting it, passing it through the machine disinfecting it and then discharging it back.

U.S. Pat. No. 5,176,445 discloses retrofitting asphalt production plant into a device capable of efficiently decontaminating soil.

U.S. Pat. No. 5,430,691 discloses a shock wave generator for removing various deposits from industrial machinery parts, for example to clear clogged pipes or to ensure free flow of dry materials.

Thus there is a need for and would be advantageous to have an efficient method for soil disinfection and aeration and in particular, for the destruction of soil pests and pathogen. It is also a purpose of the invention to provide a method that can be applied to large and small areas a method which is not climatic dependent, nor require the application to the soil of environmentally and human detrimental chemicals.

SUMMARY OF THE INVENTION

According to the present invention there is provided a method for soil disinfection and in particular, for the destruction of soil pests and pathogens and an efficient method for soil aeration. According to the present invention there is provided a method which can be applied to large and small areas, independent of climate, nor does the method require use of undesired chemicals introduced into the soil.

The method is easy to use and inexpensive to implement.

According to the present invention there is thus provided, in accordance with some preferred embodiments of the present invention, a system for soil disinfecting and soil aeration, by generating shock waves and a flow of detonation products on soil particles.

According to the present invention there is provided a system for soil disinfection and aeration A combustion chamber includes an input port which supplies a predetermined air-fuel mixture to the combustion chamber An igniter ignites the air-fuel mixture in the combustion chamber. The ignition causes a detonation therefore generating shock waves and a flow of detonation products at high temperature. Means for shifting soil particles are used to shift the particles into an internal space where shock waves and detonation products propagate.

A rotovator which has rotary blades crumbles soil and shifts soil particles into the internal space of the rotovator. A flame arrester is attached between an air-fuel supply line supplying the air-fuel mixture and the input port. The flame arrester is operative to prevent backfire from the combustion chamber back to the air-fuel supply line and allows operating with high sequence of detonation pulses Moreover, the flame arrester preferably includes channels with small diameter, less than two millimeter and a length above 60 millimeters. An outlet nozzle increases the pressure of the detonation wave and thereby increase the pressure of shock waves and velocity of detonation products The outlet nozzle allow pressure control of the detonation wave by changing the angle of cone and control shock wave pressure and detonation product velocity, in our case the outlet nozzle is operative to increase detonation wave pressure, therefore influencing a parameter of the shock wave exiting the combustion chamber such as shock wave pressure and the velocity of the detonation products exiting the combustion chamber. A reflecting plate is operative to reflect shock waves after the shock waves pass through soil particles. The reflecting plate is positioned on side of the rotovator opposite exit from combustion chamber. The system is connected and pulled by a mode of transportation used in agriculture, such as a tractor, to efficiently disinfect large areas of soil.

According to the present invention there is provided a method for soil disinfection and aeration, a predetermined air-fuel mixture is initially supplied to a combustion chamber which has an input port The air-fuel mixture is ignited within the combustion chamber. Detonation is caused and as result detonation products and shock waves are generated Soil particles are shifted into a space where the shock waves and detonation products propagate. The temperature of the soil particles and pressure in the soil particles are increased. The ignition of the air-fuel mixture creates a detonation process in the combustion chamber which produces shock waves and detonation products, which are generated and impinge on soil particles within an interior space of a rotovator. The rotovator preferably has rotary blades which breaks the particles of the soil into smaller particles. A reflecting plate receives a shock wave after passing the soil particles and reflects the shock wave backward into the interior space of the rotovator. As result of the interaction between detonation products and soil particles a drag effect of detonation products is initiated which creates a flow of soil particles flowing towards a reflecting plate resulting in high impact between the soil particles and the reflecting plate Preferably, the cultivating process breaks soil into fine crumbs ready for aeration Preferably, the velocity of detonation products flow exiting the combustion chamber is between thirty and sixty per cent of a velocity of the detonation wave velocity, gas flow temperature exiting said combustion chamber is in the range 2500-3500 degrees Celsius.

BRIEF DESCRIPTION OF THE DRAWING

The invention is herein described, by way of example only, with reference to the accompanying drawings, wherein:

FIG. 1 is a simplified system drawing according to an embodiment of the present invention;

FIG. 2 is a drawing of the outlet nozzle according to an embodiment of the present invention;

FIG. 3 is a drawing a of the flame arrester, according to embodiments of the present invention;

FIG. 4 is a drawing of five steps of the soil particles, according to embodiments of the present invention; and FIG. 5 is a drawing illustrating operation according to an embodiment of the present invention, specifically a tractor hauling a soil disinfecting system.

DETAILED DESCRIPTION OF THE PREFERRED EMBODIMENTS

The present invention is of a system and method for soil disinfection and aeration, by generation of shock waves by detonation, and a flow of detonation products on soil particles Specifically, the system and method enables an agriculturist to treat large and small areas of soil for the destruction of soil pests and pathogens without introducing chemicals to the soil.

The principles and operation of a system and method for soil disinfecting and soil aeration, by generating shock waves and a Sow of detonation products on soil particles, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings The invention is capable of other embodiments or of being practiced or carried out in various ways. Also, it is to be understood that the phraseology and terminology employed herein is for the purpose of description and should not be regarded as limiting.

Reference is made to FIG. 1, a system (10) which aerates and disinfects soil, according to an embodiment of the present invention. Air flows in an air supply line (110) and fuel flows in a fuel-supply line (120) both into a mixer (130) at a junction of both lines (110,120). Mixer (130) mixes the air and fuel according to a predefined proportion of the air and the fuel, after which the air-fuel mixture flows directly to an input port of a combustion chamber (160) via flame arrestor (140).

After the combustion chamber is filled with the air-fuel mixture, an ignition it initiated by igniter (150). The flame arrestor allows a rapid sequence of detonation pulses which are required for the disinfection process. The flame arrester prevents backfire to the air-fuel supply lines. The ignition causes combustion of the air-fuel mixture starting from the ignition up to a point approximately ten times the diameter of combustion chamber (160). At this point the combustion process turns to detonation process, after which propagation of detonation wave starts. The detonation wave is composed of a flame front which ends at exit portion of nozzle (170) and also composed of high pressure front.

Shock waves (180), followed by detonation products, are created on the edge of the outlet nozzle (170). Shock waves are propagated in the interior space of the rotovator. Combustion chamber (160) is connected to the frame of a rotovator (115). Simultaneously, the rotovator rotary blades (190) crumble the soil into soil particles (111), which later benefits aeration Rotovator's rotary blades (190) shift the soil particles into an internal space of the rotovator (115) where they are treated by shock waves and detonation products, causing a rise in the temperature of soil particles and creates high pressure deformation wave into the soil particles Moreover, the impact of shock waves on soil particles (111) further crumbles the soil making the soil particles even smaller. Moreover the detonation products accelerate the soil particles toward the reflecting plate (100) which is operative to reflect shock waves, thereby causing reflected shock wave to treat soil particles once more. Moreover, the impact due to the collision of soil particles with the reflecting plate, further eliminate soil pests and pathogens Reflecting plate (100) is connected to rotovator (115) by welding or fasteners, e.g. screws. Reflecting plate (100) is connected to the back of rotovator (115), behind the rotary blades.

The effect of shock waves and detonation products on soil particles create pressure and deformation wave in soil particles resulting in an increase temperature of soil particles. The increased soil particles temperature disinfects the soil from pests and pathogens. Increasing the deformation wave and the temperature of soil may be better understood according to the following explanations.

The shock waves increase the pressure, as previously described, in soil particles therefore crumbles the soil particles, making them smaller, which is beneficial for future aeration since the seedbed of soil at the end of the process will be with high concentration of air. The impact transferred from shock wave to soil particles also transfers to soil pests and pathogens, and destroying them. When the shock waves are reflected back, the soil particles are treated once more. The reflected wave is approximately ten times higher in pressure amplitude as compared to the initial shock wave, therefore the second treatment of the shockwave has higher impact on soil particles.

A force applied to soil particles by detonation products carries the soil particles along with the detonation products towards the reflecting plate. The force (F) is determined according to Equation 1, wherein the drag coefficient number ($C_d$) is soil particle shape dependent number, which is estimated to be 0.9-1. The detonation products velocity ($U_{dp}$) is approximately 45% of the detonation wave velocity which is typically 2300-2500 meter per second for propane-butane-air mixture, therefore the velocity of detonation product is 1000-1200 meter per second for propane-butane-air mixture. There may be different air-fuel mixtures which may be used, and will have different velocity parameters. The density of detonation products is marked as ($\rho$) and the diameter of a soil particle is marked as (d).

$$F = C_d \times \pi \times d^2/4 \times \rho \times U^2_{dp} \qquad \text{Equation 1}$$

The derivative of the velocity of soil particles under the drag effect of detonation products is determined according to Equation 2, wherein the density of soil particles ($\rho_1$) is 3-4 kilogram per cubic meter.

$$dU/dt = 3C_d \times \rho \times (U_{dp}-U)^2/4 \times \rho_1 \times d \qquad \text{Equation 2}$$

The velocity of soil particles under the drag effect of detonation products is determined according to Equation 3, after integration applied on Equation 2, wherein the initial velocity of soil particle is zero and the time (t) of interaction between soil particles and detonation products is 0.5-1 seconds $$U = U_{dp}(1 - 1/1 + t/\tau_0) \qquad \text{Equation 3}$$

($\tau_0$) is determined according to Equation 4.

$$\tau_0 = 4\rho_1 \times d/3C_d \times \rho \times U_{dp} \qquad \text{Equation 4}$$

According to calculations of Equations 1-4, the velocity of soil particles after the interaction with detonation product equals the velocity of the detonation product. High velocity of soil particles result from interactions between detonation products and soil particles The flow of detonation products carries on the soil particles toward the reflecting plate.

The temperature created during the process also affects the soil particles, the temperature of soil particles transmitted directly to the soil pest and pathogens which destroys them The temperature change of a soil particle as a function of time is determined according to Equation 5, wherein the dynamic viscosity coefficient number ($\mu$) is approximately $5 \times 10^{-4}$ gr/cm, practically for all kind of soil the value of $\rho_1 \times C_1$ is approximately ~4 J/cm$^3$× degree the detonation products velocity ($U_{dp}$) is between 1000-1200 meter per second for an air-propane-butane mixture, Density of detonation products ($\rho$) is 3-4 kg/m$^3$ and the diameter of a soil (d) is 1 mm as mentioned above and the heat flow transmitted from detonation products to soil particles (Q) is $10^7$ J/kg.

$$dT/dt = 2.8\mu^{0.45} \times \rho^{0.55} \times U_{dp}^{0.55} \times Q/d^{1.45} \times \rho_1 \times C_1 \qquad \text{Equation 5}$$

If Q does not change during the interaction between soil particles and detonation products and if the temperature of the soil particles is significantly lower then the temperature of detonation products, then dT/dt=constant. Therefore the temperature of a soil particle as a function of time is determined according to Equation 6.

$$T(t) = T_0 + (T_{DP} - T_0) \times t/\tau \qquad \text{Equation 6}$$

The length of time to reach a maximal temperature of soil particle is determined according to Equation 7.

$$\tau \sim (d/20 \times 10^{-6})^{1.45} \times 40\ \mu s = 10\ \text{sec.} \qquad \text{Equation 7}$$

Therefore a soil particle of 1 mm will reach the detonation products temperature, when in full contact, within 10 seconds. Typically the contact time between soil particles and detonation products is between 0.5-1 second, therefore a soil particle reaches a temperature of 150-300 degrees Celsius.

Soil pests and pathogens subjected to such harsh physical actions, as high pressure shock waves, high temperature and high velocity of detonation products, can not survive.

Figure 2:
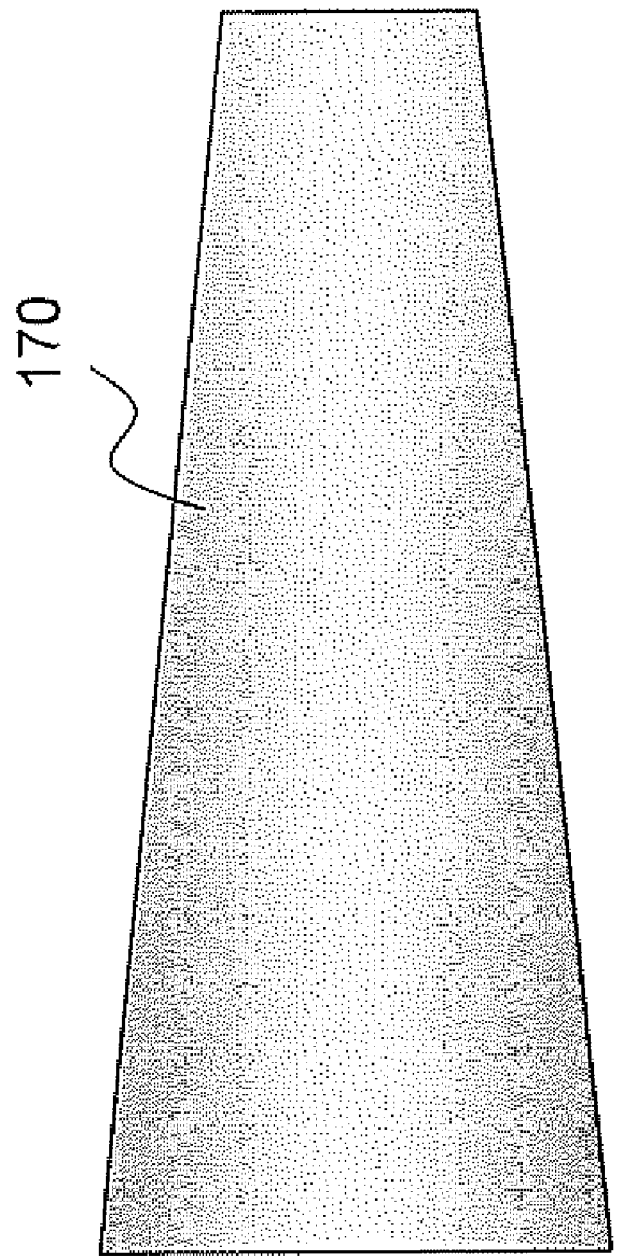

Reference is made to FIG. 2, a drawing illustrating an outlet nozzle (170 attached to the edge of combustion chamber (160), the outlet nozzle allows increasing the pressure of detonation waves, as a result shock waves pressure and detonation products velocity are amplified at the exit of the outlet nozzle.

Figure 3:
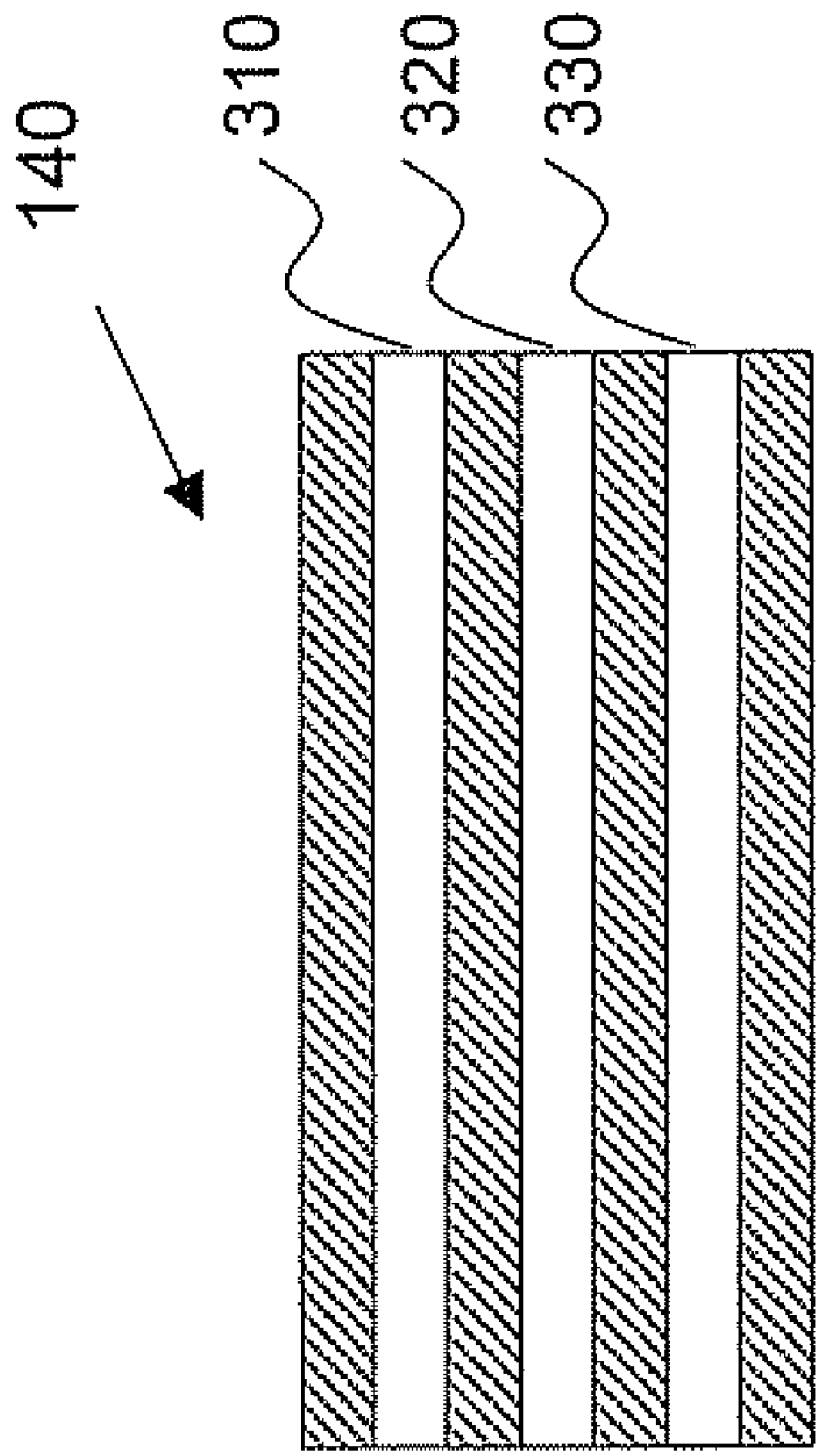

Reference is made to FIG. 3, a drawing illustrating a flame arrester (140) attached between the air-fuel supply line and the input port of combustion chamber (160), is operative to prevent backfire from combustion chamber (160) into air-fuel supply line, as the flame initiated by the igniter and is directed and propagating forward, towards combustion chamber (160), not capable of propagating backwards in the flame arrestor channels (310, 320 and 330) having small diameters, less then 2 mm and length more then 60-80 mm. avoiding backfire significantly and increases the safety of the system. Moreover, the flame arrester allows operating with high sequence of detonation pulses, in other words, there are more detonation pulses per time interval, as it is needed for efficient soil disinfection.

Figure 4:
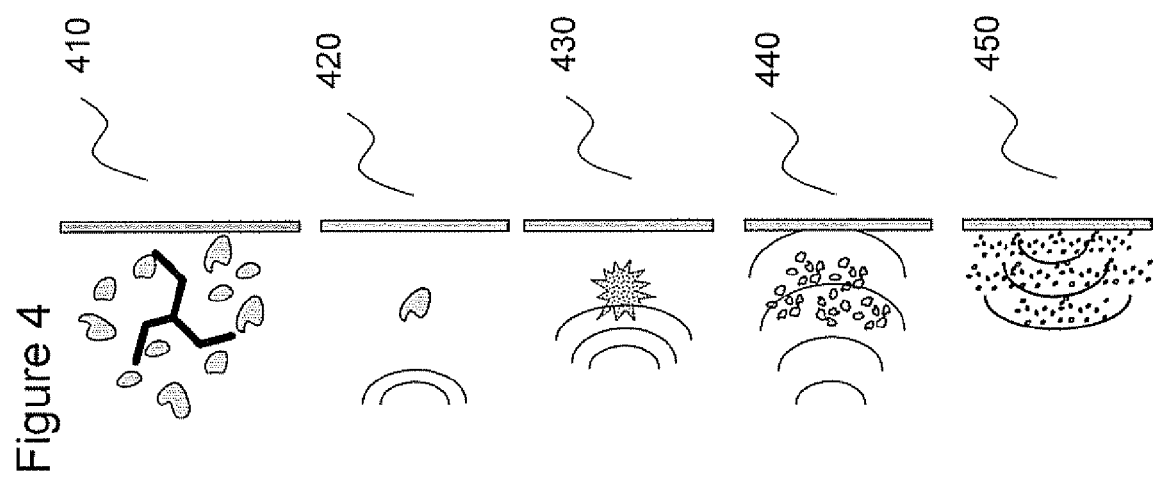

Reference is made to FIG. 4, which schematically illustrates cultivation and shock wave treatment on soil particles, according to embodiments of the present invention Step 410 illustrates the cultivation process, wherein rotovator (115) crumbles the soil into smaller soil particles.

Step 420 illustrates a propagation of a shockwave towards a soil particle, the propagation occurs out of combustion chamber (160). Step 430 illustrates a contact between shock waves and a soil particle, which as a result increase the temperature and pressure of soil particles and the soil pests and pathogens inside, thereby disinfecting the soil. The velocity of detonation products stream, exiting from combustion chamber (160) is 45% of a velocity of denotation waves within combustion chamber (160) and gas flow temperature exiting from said combustion chamber (160) is approximately 3000 degrees Celsius.

Step 440 illustrates the impact of the shock waves on soil particles, crumbling the soil particles into smaller particles providing a soil with high concentration of air which is later benefited for the soil aeration.

Step 450 illustrates a phase wherein the shock waves are reflected back, thereby treat the soil particles once more, the wave reflected is ten time more in amplitude pressure as compared to the initial shock wave, therefore the second treatment of the shockwave has higher impact on soil particles. It also illustrates the impact due to the collision of soil particles with the reflecting plate. The device may be connected and pulled by a mode of transportation used in agriculture, such as a tractor, to efficiently disinfect large areas of soil.

Figure 5:
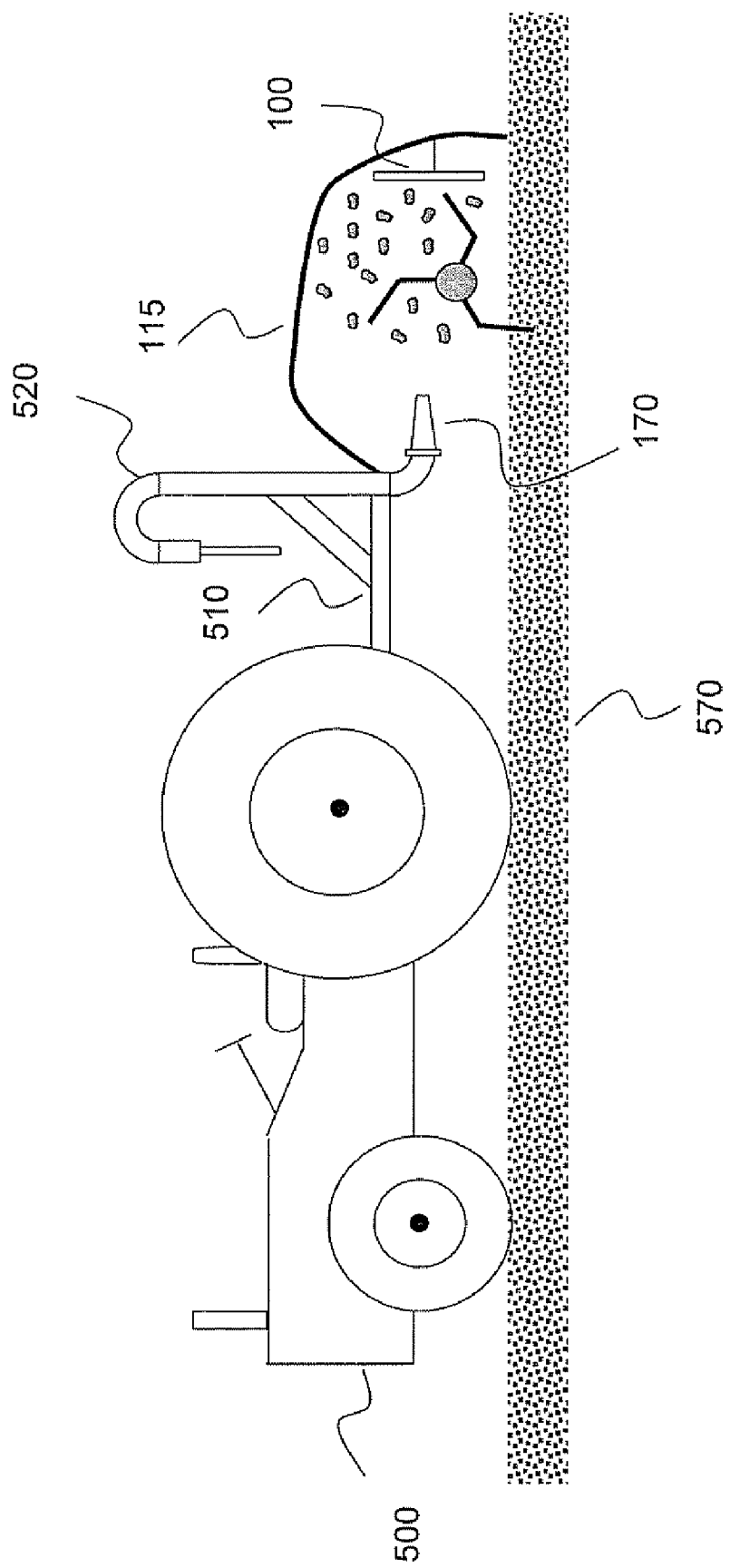

Reference is made to FIG. 5, which illustrates a hauling means e.g. a tractor (500) connected by a towing connector (510) to a soil disinfecting system (10). Connector (510) between tractor (500) and system (10) allows the dragging of system (10) and rotovator (115) over large soil area (570), providing an efficient disinfecting tool The system includes a body (520) where the ignition and combustion and later detonation occurs and detonation products and shock waves exit from outlet nozzle (170). The soil particles are shifted to a space, preferably a space of a rotovator (115) and treated by the shock waves and detonation products. A reflecting plate (100) reflects back to the space the shock wave once more, for a second treatment of soil particles. Soil particles receive an additional impact during collision with the reflector plate.

As such, those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

While the invention has been described with respect to a limited number of embodiments, it will be appreciated that many variations, modifications and other applications of the invention may be made.

SOIL DISINFECTION TEST RESULTS

Test Results of Kill Rate after applying Pulse Detonation technology over "Nematodes-Javanica Larva" Infected Soil 1. First Test 1.1. First phase of the test: Ten (10) samples of infected soil portions were tested, each portion had 40 Nematodes inside, each sample was than subjected to pulse detonation action and than soil was examined in a laboratory by Berman funnel technique. The results are as follows:

| Sample number | Number of surviving Nematodes | Efficiency % |
| --- | --- | --- |
| 1-8 | 0 | 100 |
| 9 | 1-2 | 97.5 |
| Reference sample | 40 | n/a |

1.2. Second phase of the test: Pulse Detonation action was applied over eight (8) other soil samples included roots infected by Root knot sphere nematodes that include eggs inside the sphere.

The samples of sphere nematodes were place in condition to provide eggs hatch.

Soil was examined in a laboratory by Berman funnel technique,

TABLE

The nematodes hatched from spheres.

| Sample Number | Average Qty. of surviving nematodes | Efficiency % |
| --- | --- | --- |
| 1 | 20 | 93.4 |
| 2 | 30 | 90 |
| 3 | 20 | 93.4 |
| 4 | 20 | 93.4 |
| 5 | 20 | 93.4 |
| 6 | 30 | 90 |
| 7 | 20 | 93.4 |
| 8 | 20 | 93.4 |
| Reference | 300 | n/a |

Notes:
Soil was infected with *Meloidogyne Javanica* - Larva by the laboratory, half of the infected soil was kept for reference and the rest was treated by the Pulse Detonation Technology.
Soil with sphere infected roots was taken from a farm agriculture field.
Samples were tested by a Privet official authorized laboratory.
The numbers in the table refer to a sample of 50 grams of soil (standard sample)

2. Second test

Following are the nematology test results for infected soil that was disinfected by Pulse Detonation Technology. Soil was examined in a laboratory by Berman funnel technique

TABLE

Parasite nematodes found in the soil samples

| Sample markings | Qty. of surviving Nematodes. | Efficiency % |
| --- | --- | --- |
| A | 1 | 97 |
| B | 0 | 100 |
| C | 0 | 100 |
| D | 2 | 94 |
| E | 0 | 100 |
| F | 0 | 100 |
| G | 2 | 94 |
| H | 1 | 97 |
| I | 0 | 100 |
| J | 0 | 100 |
| K | 0 | 100 |
| L | 0 | 100 |
| Reference 1 | 44 | n/a |
| Reference 2 | 25 | n/a |
| Reference 3 | 35 | n/a |
| Reference 4 | 22 | n/a |
| Average ref. | 31.5 | n/a |

Notes:
Soil was infected with Meloidogyne Javanica - Larva by the laboratory, half of the infected soil was kept for reference and the rest was treated by the Pulse Detonation Technology.
Each sample in the table refers to 50 grams of soil (standard sample)
Samples were tested at the main Nematode testing laboratory of the Israeli Agriculture Ministry.

What is claimed is:

1. In a system for disinfection and aeration of soil, a method comprising the steps of:

(a) supplying a predetermined air-fuel mixture to a combustion chamber, said combustion chamber having an input port; and (b) igniting said air-fuel mixture in said combustion chamber said igniting causing a detonation thereby generating detonation products and shock waves; and (c) shifting particles of the soil into a space, wherein said shock waves propagate into said space and impinge on said particles and detonation products contact said soil particles.

2. The method, according to claim 1, whereby temperature and pressure applied to said particles of the soil is increased.

3. The method, according to claim 1, further comprising the step of:
   (d) upon said shock waves passing though said space, reflecting said shock waves back though said space.

4. The method, according to claim 1, further comprising the step of, and prior to said shifting particles:
   (d) cultivating soil by rotary blades, whereby said cultivating breaks said particles of the soil into smaller particles.

5. The method, according to claim 1, wherein said detonation products and said soil particles interact and create a drag effect, wherein a flow of said soil particles flows towards a reflecting plate resulting in a high impact between the soil particles and the reflecting plate.

6. A system for soil disinfection and aeration, the system comprising:
   (a) a combustion chamber including an input port for supplying a predetermined air-fuel mixture to the combustion chamber;
   (b) an igniter for igniting said air-fuel mixture in said combustion chamber, said igniting causing detonation thereby generating shock waves; and
   (c) means for shifting soil particles into an internal space, wherein said shock waves propagate into said internal space and said detonation products contact said soil particles.

7. The system of claim 6 further comprising:
   (d) a rotovator having rotary blades for crumbling soil and shifting soil particles into said internal space of said rotovator.

8. The system of claim 6 further comprising:
   (d) a flame arrester attached between an air-fuel supply line supplying said air-fuel mixture, said flame arrester operative to prevent backfire from said combustion chamber to said air-fuel supply line.

9. The system, according to claim 8, wherein said flame arrester allows operating with high sequence of detonation pulses.

10. The system, according to claim 8, wherein said flame arrester includes channels of diameter less than two millimeter and of length greater than sixty millimeters.

11. The system of claim 6 further comprising:
    (d) an outlet nozzle operative to increase pressure of the shock waves and the velocity of detonation products.

12. The system, according to claim 11 wherein said outlet nozzle is operative to increase detonation wave pressure thereby influencing at least one parameter of the shock wave.

13. The system for soil disinfection and aeration according to claim 6, the system further comprising:
    (d) a reflecting plate operative to provide a collision surface against which said soil particles collide and to reflect said shock waves after said shock waves pass through said soil particles.

14. The system, according to claim 13, wherein said reflecting plate is positioned opposite exit from said combustion chamber.

15. The system, according to claim 6, is connected and pulled by means of a transportation means used in agriculture.

* * * * *